United States Patent [19]

Copia

[11] 4,449,962
[45] May 22, 1984

[54] CUTTING/SEALING DEVICE FOR PLASTIC BAG MAKING MACHINES

[75] Inventor: Carlos R. D. S. Copia, Sao Paulo, Brazil

[73] Assignee: Maquinas Npu Ltda., Sao Paulo, Brazil

[21] Appl. No.: 348,161

[22] Filed: Feb. 12, 1982

[30] Foreign Application Priority Data

Mar. 12, 1981 [BR] Brazil ................................. 8101449

[51] Int. Cl.³ ............................................. B31B 1/64
[52] U.S. Cl. ................................. 493/209; 156/583.1; 493/203; 493/470
[58] Field of Search ................ 493/209, 203, 206, 207, 493/199, 193, 194, 372, 470; 156/583.1, 515; 83/171

[56] References Cited

U.S. PATENT DOCUMENTS

| | | | |
|---|---|---|---|
| 3,078,201 | 2/1963 | Christie | 156/583.1 X |
| 3,334,004 | 8/1967 | Faust et al. | 156/583.1 X |
| 3,470,795 | 10/1969 | Davis, Jr. | 493/203 X |
| 3,902,954 | 9/1975 | Lotto | 156/583.1 X |
| 3,940,305 | 2/1976 | Stenberg | 493/203 X |
| 4,313,781 | 2/1982 | Rovigo | 156/583.1 X |

*Primary Examiner*—James F. Coan
*Attorney, Agent, or Firm*—D. Paul Weaver

[57] ABSTRACT

A plastic bag making machine of the type consisting of opposing vertically aligned upper and lower machine sections which move in unison toward and away from each other to cut and seal plastic film being conveyed between the two machine sections on a horizontal path possesses three main features. The first feature is a simplified holding and feeding mechanism on each machine section for advancing periodically worn out teflon film without the necessity for manipulating large numbers of screws and other devices. The second feature is that the cutting/sealing device can act on plastic film either in premolded tube form or longitudinally folded form while passing through the machine to produce plastic bags by cutting and sealing either form of film repeatedly. A third feature of the device is the provision of mechanism to prevent and compensate for buckling in two planes of heating and sealing bars on the upper and lower machine sections.

8 Claims, 8 Drawing Figures

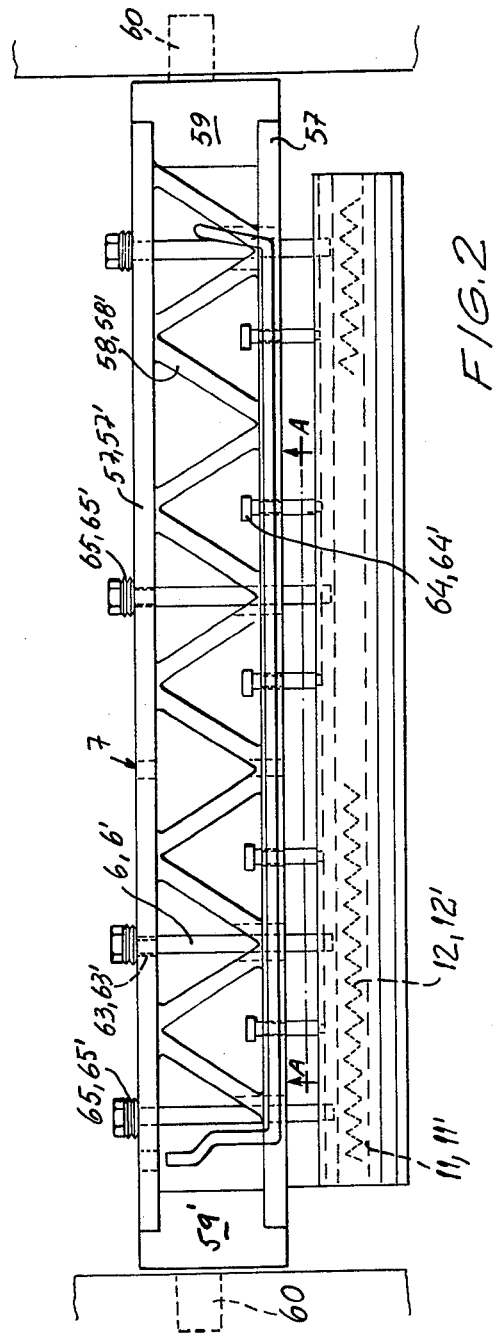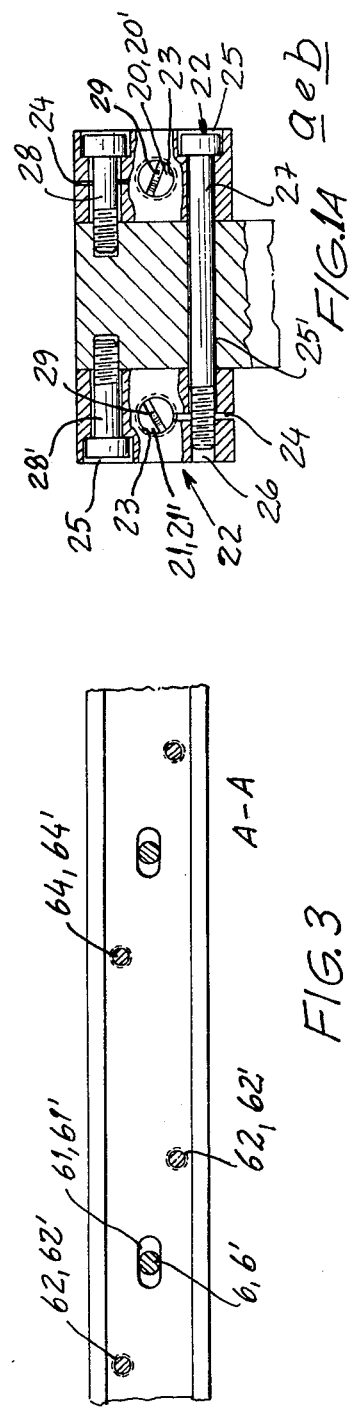

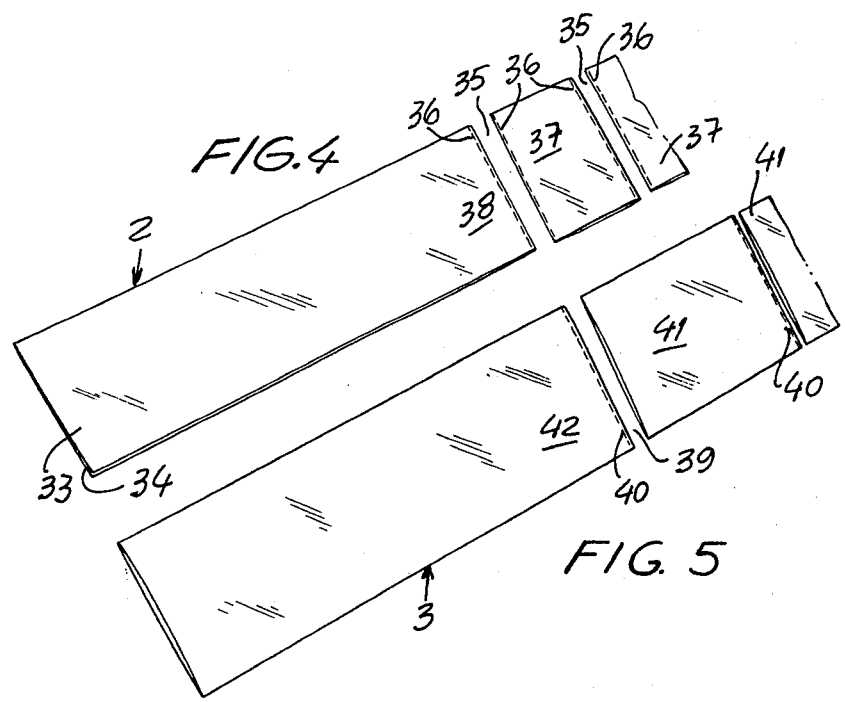
FIG. 4
FIG. 5
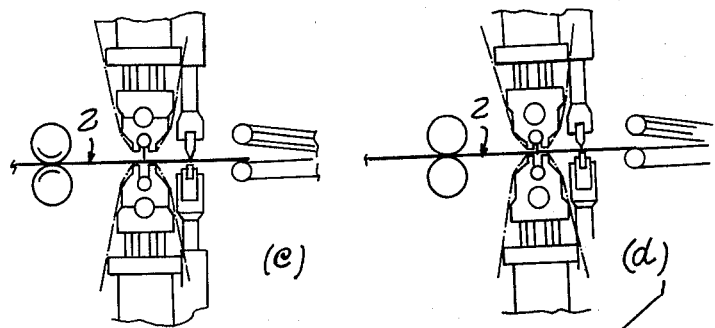
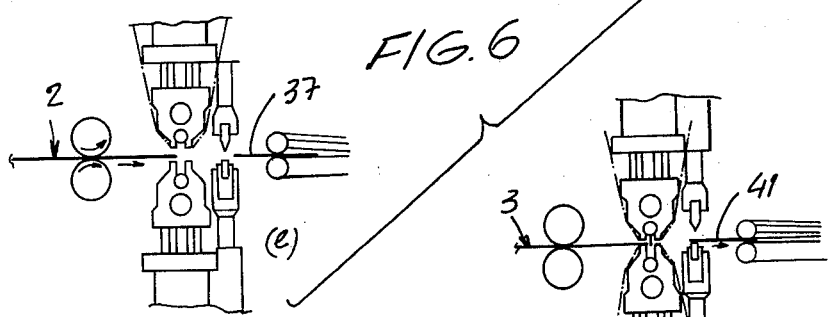
FIG. 6
FIG. 7

CUTTING/SEALING DEVICE FOR PLASTIC BAG MAKING MACHINES

BACKGROUND OF THE INVENTION

The present invention relates to improvements in cutting/sealing devices for plastic bag making machines.

Prior art bag making machines commonly are of a type consisting of a rectangular base frame provided at one of its ends with a support member for a spool of printed and folded or molded plastic film, a sequence of rolls extending from the spool support member and also mounted on the base frame and disposed up to the middle of the latter. In this area, the cutting/sealing device is transversely disposed to receive the traveling plastic film between its two sections, whereby the film is cut and sealed to form the plastic bag. The thus formed bag leaves the cutting/sealing area of the device on an endless belt conveyor traveling on the base frame to be collected at the edge of the other base frame end.

Known cutting/sealing devices consist essentially of an upper section and a lower section of identical construction which are aligned vertically, one of them operating in a guillotine-like manner and being actuated like cams connected to the machine motor. The plastic film to be cut and sealed travels horizontally between the two sections, perpendicularly to their common axis, the cutting/sealing action being performed by means embodied in the device.

Each section forming the device comprises essentially a sealing bar of trapezoidal cross section which seats on a heating bar, the latter resting on a support member. The sealing bar and heating bar are provided in their opposing faces with a longitudinal channel-like member. The downstream portions of the channel-like members are heated by an electrical resistance element located in a duct between the sealing and heating bars, the downstream portions comprising the sealing surfaces for sealing the plastic bag after it has been cut by a knife member located in the channel-like member of the lower sealing bar.

The so-constructed sealing bars are coated with a teflon film, the main purpose of which is to cover the sealing surfaces. The teflon film is secured to the side faces of the sealing bar by a plurality of bolts and extends therefrom through the sealing surfaces and into the channel-like member. In the channel-like member, the teflon film is secured to the upper sealing bar by means of a rod-like stretcher which lies at the bottom of the channel-like member. The teflon film is also secured to the lower sealing bar by means of a rod-like knife member support located at the bottom of the channel-like member.

The teflon film becomes warn out by continued use and requires replacement. In the known cutting/sealing devices where the film is secured by a plurality of bolts, a stretcher and a knife member support, relacing the film becomes a burdensome task in that removal and remounting of all of the fixing elements is required, resulting in excessive down time for the machine and consequent economic loss.

Having the above disadvantages in mind, this invention provides improvements in the cutting/sealing device for plastic bag making machines, and a major object of the invention is to provide the device with means which allow replacement of the teflon film without the need for handling so many screws and components, thus significantly shortening the machine down time.

The plastic film used to form the bag is available to bag manufacturers in two basic forms. In one form, the film is supplied as a plastic sheet folded longitudinally and in the other form the plastic film is molded into a tubular form.

The known cutting/sealing devices require troublesome changes and adjustments to handle either form of plastic film, thus causing long machine down times.

Therefore, a second objective of the invention is to provide a cutting/sealing device having means which permits manufacturing plastic bags from either form of presentation of the plastic film, always having in mind a minimizing of machine down time.

A very frequent problem arising with known cutting/sealing devices for plastic bag making machines is buckling resulting from excessive heating of the sealing bars. Such buckling effect in the cutting/sealing device causes defective sealing of the plastic bags and generalized malfunction of the unit. It is therefore another object of the invention to provide means to avoid or straighten out any buckling of the cutting/sealing device.

All of the foregoing will be better understood from the following description of the invention, taken with the accompanying drawings.

BRIEF DESCRIPTION OF THE DRAWINGS

FIG. 1A is an enlarged cross sectional view showing details indicated at a and b in FIG. 1.

FIG. 2 is an elevational view of the upper section of the cutting/sealing device looking at right angles to FIG. 1.

FIG. 3 is a horizontal section taken on line A—A of FIG. 2.

FIG. 4 is a perspective view showing presentation of plastic film in longitudinally folded form.

FIG. 5 is a similar view showing presentation of the film in tubular form.

FIG. 6 is a composite side elevation of the device in stages of operation on the film shown in FIG. 4.

FIG. 7 is a side elevation of the device operating on the plastic film shown in FIG. 5.

DETAILED DESCRIPTION

Figure 1:
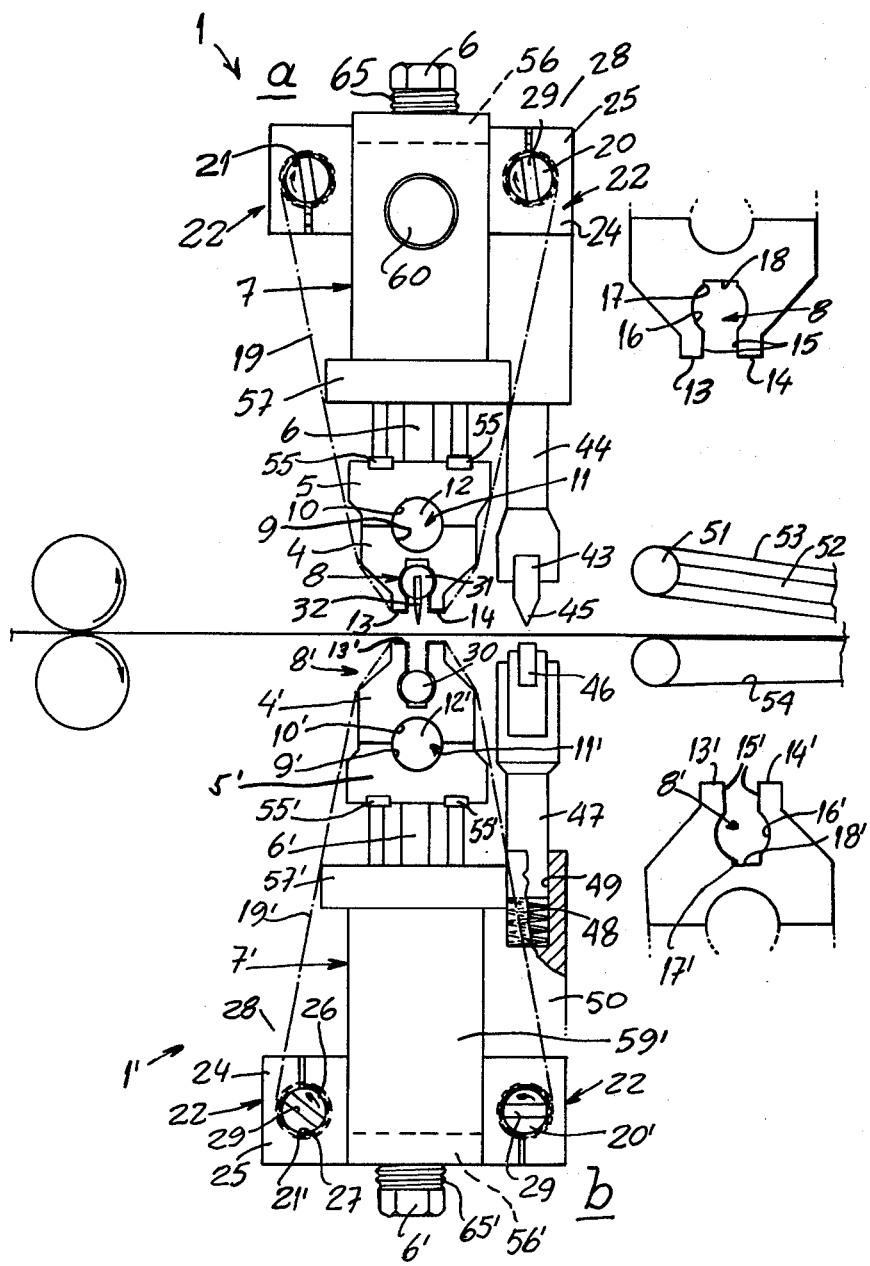
FIG. 1 is a side elevation of a cutting/sealing device according to the invention.

Referring to the drawings in detail wherein like numerals designate like parts, a cutting/sealing device for plastic bag making machines comprises an upper section 1 and a lower section 1' which are substantially identical in shape. The upper and lower sections 1, 1' are vertically aligned and both move in a guillotine-like manner upon actuation of cams connected to a machine motor, not shown, so that parts of the device cut and seal a plastic film 2 or 3, FIGS. 4 and 5, which travels horizontally between the two sections of the device to form the plastic bag.

Sections 1 and 1' include, respectively, an upper sealing bar 4 and lower sealing bar 4' fixed by bolts, not shown, to corresponding heating bars 5 and 5'. Heating bars 5, 5' are fixed by means of studs 6, 6' to a corresponding upper member 7 and a lower support member 7' connected to the machine actuating means. The sealing bars 4, 4' have a substantially trapezoidal cross section and are each provided on their opposing surfaces with respective longitudinal channel members 8, 8'.

On the common opposite face of sealing bars 4, 4' which lies adjacent to the corresponding heating bar 5 or 5', there are provided semi-circular channel members 9, 9'. Channels 9, 9' are juxtaposed with identical channel members 10, 10' disposed on heating bars 5 and 5' to form a duct 11, 11', respectively. The ducts 11, 11' receive electrical resistances 12, 12' for heating a front sealing surface 13 and a rear sealing surface 14 on the upper sealing bar 4 as well as a front sealing surface 13' and a rear sealing surface 14' on the lower sealing bar 4'. Said sealing surfaces consist of regions adjacent to channel members 8, 8' and they cause sealing of the lateral side or bottom side of the plastic bag immediately after the film 2 or 3 is cut.

The first improvement in the cutting/sealing device relates to replacement of the teflon film used to cover sealing surfaces 13, 13' and 14, 14'. Replacement of the teflon film is effected without the need for handling a large number of bolts and components as in the prior art. The first feature of this improvement is the provision of channel members 8, 8' with respective flat wall sections 15, 15' located close to the channel member mouth. Front flat wall sections 15, 15' extend correspondingly intermediate curved concave sections 16, 16', and from the latter extend short straight sections 17, 17' which are respectively aligned with sections 15, 15', from which are orthogonally extended bottoms 18, 18' of the channel members 8, 8'.

Another construction which in cooperation with the channel members 8, 8' allows replacement of the teflon film 19, 19' in a simplified manner consists in providing each support member 7, 7' with feed spool rods 20, 20', respectively, each located on one of the lateral faces of the support members, the common opposite face of the support members being provided with receiving spool rods 21, 21'. Spool rods 20, 21, and 20', 21' lie parallel to sealing bars 4, 4', both spool rod types seating on a bearing support member 22 consisting of a rectangular block having on opposite faces a through opening 23, FIG. 1A. Through opening 23 receives the ends of the spool rods and a slot 24 extends radially from the opening 23 to one of the smaller edges of the support member 22. Support member 22 also has on other opposite faces two parallel threaded ducts 25, 26 between which is perpendicularly disposed the through opening 23, FIG. 1A. Duct 25 is continuous while duct 26 is formed in two aligned sections disposed in each of the parts of support member 22 separated by the slot 24. The thus formed support members 22 and receivers of rods 20, 20' seat on the ends of the faces of support members 7, 7' which are easier to reach by a tool, and have the slots 24 disposed in opposite directions to slots 24 on the support member 22 of rods 21, 21', said slots being located on the opposite inaccessible faces of support members 7, 7'. The ducts 25 and 26 on support members 22 of rods 20, 20' receive, respectively, bolts 27, 28. The bolt 27 is longer and extends through a duct 25' provided on support members 7, 7', the bolt end resting in duct 26, FIG. 1A, on support member 22 for rods 21, 21'. Bolt 28 forms a pair of identical constructions with bolt 28' held in duct 25 of support members 22 which receive rods 21 or 21'.

By means of this construction, handling of bolts 27 and 28 enables the opening or closing of slots 24 of the support members 22 of spool rods 20, 20' and 21, 21', thus enabling a greater or lesser tightening effect on the ends of the spool rods, so that they may be rotated or not by means of a slot 29 in one of their end faces to selectively rotate the teflon films 19 or 19'. Such an operation can be effected from the faces of support members 7, 7' which are easy to reach with a tool due to the locations of support members 22.

The assembled feed spool rods 20, 20' receive respective reels of teflon films 19, 19', the free ends of these films being secured to the corresponding receiving spool rods 21, 21'. Before fixation of the free ends, the films 19, 19' are folded over sealing bars 4, 4' whereon they first cover the sealing surfaces 13 and 14 and 13' and 14'. Then the films are passed inside channel members 8, 8'. In the lower channel member 8', the film 19' covers the flat wall sections 15' and lies between curved sections 16' and a cylinder rod 30 inserted between the curved sections. On the upper channel member 8, the film 19 covers flat wall sections 15 and lies between curved wall sections 16 and support member 31 which is a cylindrical rod.

The worn-out sections of the films on sealing surfaces 13, 14 and 13', 14' can be replaced by new film without handling large numbers of bolts and components as in the prior art. It is only necessary to release the clamped ends at spool rods 20, 21 and 20', 21' on support members 22 by loosening bolts 27 and 28 and rotating the spool rods to advance the films until fresh film sections are positioned on the surfaces 13, 14 and 13', 14'. Following this, the spool rods are again secured or clamped and the machine is put back into operation.

The second improvement in the device relates to use thereof for the two forms of plastic films shown in FIGS. 4 and 5 without special adjustment of the machine. In FIG. 4, a plastic film portion 2 is folded longitudinally to form two flat sections 33 and 34. The film portion 3 in FIG. 5 has been molded into a tubular form.

The film portion 2 when employed receives a transverse cut 35 for each movement of the cutting/sealing device, which cut is bounded by two welds 36 producing lateral sealing of the finished plastic bag 37 and also one lateral sealing for the next oncoming bag 38. The second and final lateral sealing for the bag 38 is effected after film portion 2 advances for a length equal to the desired width of the bag, and the cutting/sealing device is again moved whereby one of the sides of the plastic bag is sealed. The plastic bags so produced have their two sides sealed or welded and have their bottoms formed by the film fold, the mouth of each bag being formed by the free ends of flat film sections 33 and 34 which form the bag walls.

Plastic film 3 in FIG. 5 for each movement of the cutting/sealing device receives a transverse cut 39, a weld 40 being produced parallel to it. Transverse cut 39 produces the mouth for a formed bag 41, and weld 40 constitutes a seal for the bottom of a bag 42 which is starting to be produced, so that the next movement of the device following advancement of the film a distance corresponding to the length of the desired bag produces a new cut which will form the mouth for bag 42 as well as a new weld which will close up the bottom of the next bag to be produced. The plastic bags so produced will have their lateral sides formed by the longitudinal folds of the film 3, the bottoms by the welds, and the mouths by the cuts paralleling the welds.

The improvements related to the production of bags from the plastic film 2 include components for the cutting/sealing device such as a guide tongue 43 fixed by bolts, not shown, parallel to the upper sealing bar 4. Guide tongue 43 is seated through end support members 44 on upper support 7 and has a beveled edge 45 located just below the cutting edge of knife member 32 and a short distance from the plastic film 2. On section 1' of the device there is provided a rubber seat 46 in opposed parallel relation to guide tongue 43. The rubber seat 46 comprises a shaft 47 of cylindrical cross section seated on end support members. The free end of the cylindrical shaft bears on a helical spring 48 held in a cavity 49 of a block 50 which projects from lower support member 7'.

The device as described operates in a manner best understood in connection with FIG. 6.

At the instant when sections 1 and 1' of the device start to separate after sealing a lateral side of a finished plastic bag and a side of another bag that is beginning to be produced, plastic film 2 (including the film portion corresponding to the bag that is beginning to be produced) travels for a distance equal to the width of the bag to be produced and then halts. Sections 1 and 1' move simultaneously toward each other until guide tongue 43 secures the film 2 against rubber seat 46 and has it taut to be cut by knife 32, whereby sealing surfaces 13, 14 of upper section 1 immediately move to bear against sealing surfaces 13' and 14' of lower section 1' to seal the film ends produced by the cut, thus closing the second lateral side of the bag being produced and the first side of another bag which is beginning to be produced. Thereafter, sections 1 and 1' start to separate and the entire operation is repeated.

In order to produce plastic bags from the tubular film 3, FIGS. 5 and 7, guide tongue 43 is manually unbolted and raised so that it will not contact the plastic film upon movement of the sections 1 and 1' together. Tensioning of the film 3 is done by means of a roll 51 which is seated at the leading end of pivot arm 52 over which passes a belt 53. The arms 53 can move angularly in synchronism with sections 1 and 1' to make roll 51 approach or retreat from another belt 54 on which the finished plastic bags are conveyed.

The device starts to operate at the moment sections 1, 1' move to effect one more cutting/sealing operation on the already-positioned part of plastic film 3 corresponding to the mouth of the bag being produced and the bottom side of one which is beginning to be produced. Pivot arm 52 moves toward thrust roll 51 against the portion of film 3 corresponding to the bag which is being produced and is located on level conveyor belt 54. This movement of arm 52 makes said portion of the film 3 more secured and tensioned to be cut by knife 32. However, before sealing surfaces 13, 13' and 14, 14' produce the welds on the film portion ends formed by the cutting, roll 51 rotates and removes from between the sealing surfaces 14, 14' the film portion ends corresponding to the mouth of the bag being produced and now completely finished. This action of roll 51 results in that only sealing surfaces 13, 13' produce welding of the bottom of the plastic bag starting to be produced, and the mouth thereof will be made upon the next movement of sections 1, 1' whereupon welding of the bottom for a third bag will be effected.

The third improvement provided by the invention relates to means introduced into the cutting/sealing device to straighten out undesired buckling thereof due to the applications of heat for the operation; the improvement being that the upper heating bar 5 and lower heating bar 5' are provided on their common surface facing the support members 7 and 7' with two longitudinal parallel channel members 55, 55' of substantially rectangular cross section.

Another aspect of the improvement is that support members 7, 7' of a braced construction are provided, FIG. 2. Said support members comprise lateral girders 56, 56' and 57, 57', interconnected by intermediate oblique plates 58, 58' and terminal block sections 59, 59'. From block sections 59 project top pins 60 which connect support member 7 and therefore all of section 1 of the device to the machine actuating means, the girders 57, 57' being in parallel with and close to heating bars 5, 5' and providing at regular intervals a set of diagonally aligned bores, FIG. 3, said set of bores formed by two central oblong bores 61, 61' which are flanked by two circular threaded bores 62, 62'. In alignment with bores 61, 61' are provided on girders 56, 56' circular bores 63, 63' to receive bolts 6, 6' which pass through oblong openings 61,61' and are connected to heating bars 5, 5'. Threaded bores 62, 62' receive bolts 64, 64' the ends of which enter channel members 55, 55' and contact the bottoms thereof due to the action of plate springs 65, 65' arranged between the heads of bolts 6, 6' and girders 56, 56'.

Bolts 64, 64' in cooperation with channel members 55, 55' avoid the longitudinal buckling in the horizontal plane of heating bars 5, 5' and consequently of sealing bars 4, 4'. Oblong bores 61, 61' permit free movement of bolts 6, 6' upon heating and expansion of the cutting-/sealing unit caused by the electrical resistances. Bolts 6, 6' and 64, 64' may be loosened or tightened to permit correction of any buckling effect in bars 4, 4' and 5, 5' in the vertical plane.

The so constructed cutting/sealing device for plastic bag making machines has a further advantage over conventional devices of this type in that the knife member 32 operates on the upper section 1 of the unit which helps to decrease the number of accidents with the machine. Besides, this construction for the device enables welds of larger length, that is, up to 1.50 m, so that it is possible to produce longer or wider plastic bags. Such a construction makes it also possible to operate simultaneously with two tracks, that is, with two reels of films 2 or 3; said cutting/sealing device also enabling industrial sealing of bags, that is, higher resistance seals for plastic bags for products of higher weight.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a cutting/sealing device for plastic bag making machines of the type having upper and lower machine sections which are aligned vertically and are adapted to move toward and away from each other in a guillotine-like manner responsive to the action of machine cams, whereby the device may cut and seal a plastic film passing between the machine sections horizontally to produce plastic bags, said upper and lower machine sections including upper and lower sealing bars secured to heating bars in turn connected to upper and lower support members, said sealing bars being provided in their opposing faces with channel members of irregular cross section and in their opposite faces adjacent to the heating bars with semi-circular cross section channels, said semi-circular cross section channels being juxtaposed to like channels of the heating bars to provide upper and lower ducts adapted to receive electrical heating resistances to heat spaced forward and rear sealing surfaces of the upper and lower sealing bars immediately adjacent to said channel members of irregular cross section which seal the lateral sides or bottom of a plastic bag immediately following cutting of the plastic film, the improvement comprising said upper and lower channel members of irregular cross section each having flat parallel spaced wall sections defining mouths of the channel members, opposing intermediate concave wall sections leading from said flat parallel wall sections, short spaced parallel wall sections extending from the concave sections and being aligned with said flat parallel wall sections and flat bottom portions extending orthogonally between the ends of the short straight wall sections remote from the mouths of the channel members.

2. In a cutting/sealing device as defined in claim 1, each said support member being provided on opposite side faces with upper and lower pairs of spaced parallel spool rods held in bearing supports carried by the upper and lower support members, said spool rods receiving thereon teflon film reels bearing sufficient film to allow several changes of film after wear occurs caused by repeated sealing operations, the teflon films on said film reels and spool rods passing across the sealing faces of the upper and lower sealing bars and across the surfaces of said irregular cross section channel members lying between the sealing surfaces.

3. In a cutting/sealing device as defined in claims 1 or 2, wherein said bearing supports are block members having on their opposite faces through openings receiving end portions of said spool rods and being slotted radially from said through openings, said bearing supports being further provided on other opposite faces thereof with pairs of parallel threaded openings between which said through openings are perpendicularly disposed, the first of said parallel threaded openings of each pair being continuous and the other being formed in two coaxial sections, said bearing supports being seated with said spool rods held therein on end faces of said upper and lower support members for easy reaching by a tool with said slots extending in opposite directions, said parallel threaded openings of the bearing supports for the feeding spool rods receiving bolts, the first of the bolts being longer and extending into one opening of the adjacent support member, the end of the longer bolt engaging in the other threaded opening of an opposing bearing support for the receiving spool rods, the second bolts forming a pair of coaxial shorter bolts engaging in the first threaded opening on the bearing support members which hold the receiving spool rods, the operation of the bolts opening or closing said slots of the bearing supports to exert lesser or greater clamping effect on all of said spool rods which can be rotated in order to advance the teflon films.

4. In a cutting/sealing device as defined in claim 1, and said channel member of the upper sealing bar receiving between the concave wall sections thereof a cylindrical shaft member carrying a depending knife, the channel member of the lower receiving bar receiving between its concave wall sections a cylindrical shaft member.

5. In a cutting/sealing device as defined in claim 4, and the teflon film on the upper section of the device being disposed between the concave wall sections of said channel member and the cylindrical shaft member carrying said knife and extending from such location over said flat parallel wall sections to cover the front and rear sealing surfaces of the upper sealing bar from where it extends upwardly to the receiving and feed spool rods of the upper section of the device, the teflon film on the lower section of the device being disposed in said channel member between the concave wall sections thereof and said cylindrical shaft and extending therefrom over said flat parallel wall sections and then over said front and rear sealing surfaces of the lower sealing bar and then downwardly to said receiving spool rod and feed spool rod of the lower section of the device.

6. In a cutting/sealing device as defined in claim 5, and for tensioning said plastic film on the upper section of the device a guide tongue parallel to the upper sealing bar seated on the upper support member and having a beveled edge which extends to a level somewhat below the cutting edge of said knife and being spaced a slight distance from the plastic film surface, and an opposing rubber-like seat for the lower section of the device parallel to and below said guide tongue, the rubber seat being mounted on the lower support member and being yieldingly biased toward the guide tongue and being slightly below the level of the plastic film, whereby at each movement of the upper and lower sections of the device toward each other for cutting and sealing the guide tongue holds the plastic film against the rubber-like seat before the cutting thereof by said knife.

7. In a cutting/sealing device as defined in claim 5, wherein for tensioning the tubular plastic film there is provided a roller carried by a pivot arm and having a belt trained thereon, the pivot arm moving in synchronism with the upper and lower sections of the device to cause said roller to approach or retreat from an underlying conveyor belt on which finished plastic bags are held, said roller at each movement of the pivoted arm holding the plastic film against said conveyor belt and after the film is cut the roller rotates to remove a finished bag by its mouth from between the sealing surfaces of the upper and lower sealing bars.

8. In a cutting/sealing device as defined in claim 1, wherein the upper and lower heating bars are provided in their faces opposing the upper and lower support members with two longitudinal parallel channels of substantially rectangular cross section, said upper and lower support members having a braced construction consisting of parallel girders interconnected by intermediate oblique plates and by terminal blocks at the ends of the lateral girders, top pins extending from said terminal blocks and connecting the upper support member to machine actuating means, said girders being provided at regularly spaced intervals with a set of diagonally aligned bores including a central oblong bore flanked by a pair of circular threaded bores, the oblong bores receiving fixation bolts which are connected to the upper and lower heating bars, and the threaded bores receiving bolts the ends of which are disposed in said rectangular cross section parallel channels, the bottoms of said channels being forced against the ends of the threaded bores by spring pressure applied between the heads of the fixation bolts and said girders, the fixation bolts coacting with the rectangular cross section channels to avoid longitudinal buckling of the heating bars in a horizontal plane and consequently of the sealing bars, and the oblong bores allowing free movement of the fixation bolts responsive to heating and consequent expansion, and all of said bolts adapted to be loosened or tightened to allow correction of the buckling effect on the sealing and heating bars in a vertical plane.

* * * * *